B. W. Nichols,
Melodeon Coupler.

Nº 34,588.   Patented Mar. 4, 1862.

Witnesses:
S. Thompson
R. Fitzgerald

Inventor
Byron W. Nichols

UNITED STATES PATENT OFFICE.

BYRON W. NICHOLS, OF FAIR HAVEN, CONNECTICUT.

COUPLING FOR OCTAVES, &c., IN MELODEONS.

Specification forming part of Letters Patent No. 34,588, dated March 4, 1862.

*To all whom it may concern:*

Be it known that I, BYRON W. NICHOLS, of Fair Haven, in the county of New Haven and State of Connecticut, have invented a new and useful Improvement in Coupling-Octaves in Melodeons, &c.; and I do hereby declare that the following is a full, clear, and exact description of the construction, character, and operation of the same, reference being had to the accompanying drawings, which make part of this specification, in which—

Figure 1:
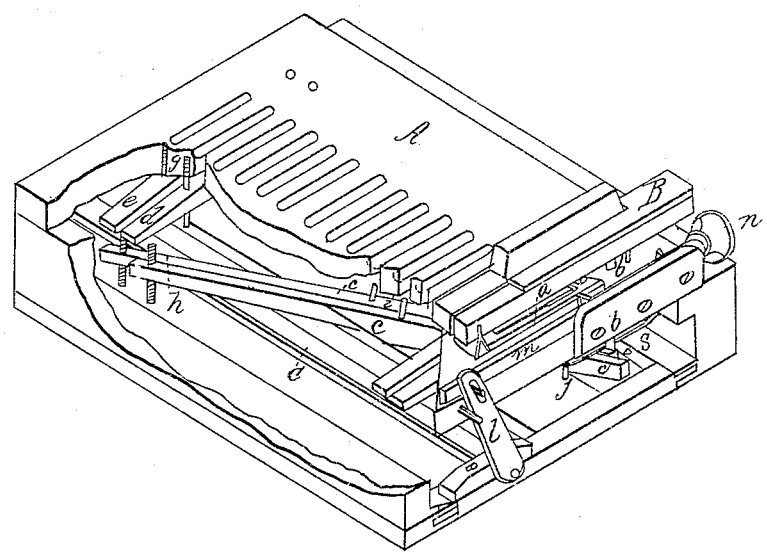
Figure 2:
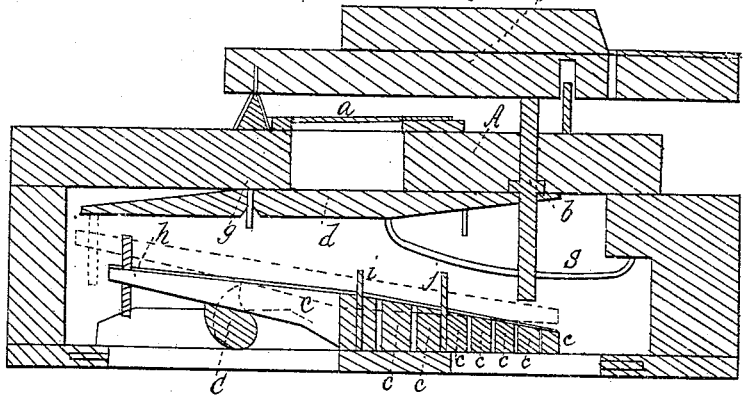

Figure 1 is a perspective view of a section of the reed-board, showing two of the diagonal levers, shaft-cam, valves, &c. Fig. 2 is a section of the same cut vertically through in the direction of the length of the reeds, showing the shape of the valves, the cross-section of the shaft-cam, pitman, &c.

My improvement consists in the use of a series of single diagonal levers to be raised into the position to connect the octave by means of a shaft-cam extending the whole length of the reed-board, so as to raise all the diagonal levers at the same time and to the same height when it is desired to couple the octaves, and in making the valves of such length and shape that they may be opened equally well by pressing the front end downward with the pitman or the rear end upward by the adjusting-screw in the rear end of the diagonal lever.

I make and connect the reed-board A, reeds $a$, valve-springs S, and keys B in the usual way and form, as indicated in Fig. 1 and in cross-section in Fig. 2, or in any other convenient way and form.

I make each of the pitmen, as $b$, Figs. 1 and 2, of sufficient length to pass through the valve, so as to act on the end of one of the diagonal levers $c$ $c$, Fig. 1, and on the central part of each pitman, I fit a suitable collar, as shown at $b$, Fig. 2, by means of which the front end of the valve is pressed downward.

I make the valves, as $d$ and $e$, substantially of the shape and proportions represented at $d$, Fig. 2—that is, extending the rear portion considerably beyond the steady-pin $g$ and beveling it downward toward the end, as shown in Fig. 2, (or the reed-board may be cut away above the rear portion of the valve to serve the same purpose,) so that the pressure of the upper end of the adjusting-screw $h$ in the rear end of each of the diagonal levers will raise the rear end of the valve and depress the front end, (the same as if pressed down by a pitman,) as the valve will rock on the reed-board at the point where the plane is changed.

I make the diagonal levers substantially of the shape shown at $c$ $c$, Fig. 1, and in section in Fig. 2, and to prevent end-chase I drop them onto steady (or guide) pins, as shown at $i$, Figs. 1 and 2. To prevent lateral oscillation, I place steady (or guide) pins between them, as indicated at $j$, Figs. 1 and 2, and in the rear end of each lever I fit an adjusting-screw, as shown at $h$, Figs. 1 and 2. When the octaves are not coupled, the levers rest (diagonally across) on the bottom of the case or top of the bellows, and on the shaft-cam C, as shown in Figs. 1 and 2; but when the octaves are coupled the levers will be raised by the shaft-cam to the position shown by the dotted lines in Fig. 2, so that the upper ends of the adjusting-screws $h$ will touch the rear portion of the valve, and the front ends will touch the lower ends of the pitmen, so that each lever will rest wholly on the most prominent portion of the shaft-cam, which will serve as one complete fulcrum on which all of the levers may be vibrated to play the octaves to the keys which are pressed.

I make the shaft-cam C of a single bar, to extend the whole length of the reed-board or such portion of it as may be desired, with its sides parallel to its axis and in cross-section, substantially of the shape shown at C, Fig. 2, and I support the journals of this shaft-cam in bearings so situated that the circular portion of the shaft will be so near the board below it as to prevent any sagging or springing when the octaves are coupled and full harmony is played. I rock this shaft-cam to couple and uncouple the octaves by means of a crank or arm $l$ with a rod $m$ on knob $n$, or by any other suitable means.

Having constructed and arranged the several parts, as described, when I wish to couple the octaves I draw forward the knob $n$, so as to rock the shaft-cam C till the most prominent portion of the cam (or that portion which is farthest from the axis of the shaft) raises the diagonal levers to the position indicated by dots in Fig. 2—that is, till the front ends of the levers touch the lower ends of the pitmen $b$, and the upper ends of the adjusting-screws $h$ touch the rear ends of the valves.

Then when any key is pressed downward it will open the valve directly under it, and also the valve of the reed which is an octave above it.

To uncouple the octaves, I push back the knob $n$, or by any means rock the shaft-cam back to the position shown in Figs. 1 and 2, when the diagonal levers will lie useless, as represented in Fig. 1. These diagonal levers may be arranged to play fifths or any other cords as well as octaves; or they may be reversed, so as to play the octave below, without any alteration in the shape or character of the valves, levers, shaft-cam, or pitmen, or any change of position, except of the levers, and the shaft-cam may be cut in two in the central part, if desired, (or made of two pieces,) and the journals of the central extremities be supported in proper bearings, so that either portion of the octave may be used alone.

The advantages of my improvement consist in that the diagonal levers are but simple bars with no appendages except the adjustable screws. The complete fulcrum is a simple shaft made cam shape in the cross-section, and each valve is one plain piece, differing from others only in the extent and shape of its rear portion, so that there are no joints to work loose, or intricacies to get out of order, and can therefore be put into instruments at far less expense, and is far less liable to get out of order than any heretofore known, and in that it may be readily attached or put into melodeons, &c., which are already made and in use, as it will require no alteration of the case, &c.

I am aware that a series of single diagonal levers has been used for coupling octaves, &c., (see E. B. Carpenter's patent, November 24, 1857,) and that a series of fulcra, with levers attached, have been brought into position by the operation of eccentrics on an independent shaft. (See T. F. Thornton's patent, March 3, 1857.) I therefore do not claim the use of diagonal levers as such, nor the use of any eccentrics or cams, which do not act directly as a fulcrum on which the series of levers coupling the octaves may be vibrated; but

What I claim as my invention, and desire to secure by Letters Patent, is—

1. A melodeon-valve made with its rear portion so extended and beveled that it may be opened by pressing the rear end toward the reed-board as readily and effectually as by pressing the front end from the reed-board when it is made and fitted for the purpose of coupling octaves, substantially as herein described.

2. The use of the shaft-cam C when it is made to serve the double purpose of bringing the diagonal levers into position, and also forming a complete fulcrum on which the whole series of diagonal levers may be vibrated when made, located, and used, substantially as herein described.

3. The use of a series of single diagonal levers $c$, in combination with valves $d$, fitted to be worked at both ends for the purpose of coupling octaves, when the whole is constructed, arranged, and fitted to produce the result, substantially as herein described.

4. The use of the series of single diagonal levers $c$, in combination with the shaft-cam C, when constructed, arranged, and operated substantially as herein described.

BYRON W. NICHOLS.

Witnesses:
S. THOMPSON,
R. FITZGERALD.